2,810,759
Patented Oct. 22, 1957

2,810,759
CATALYTIC HYDRATION OF OLEFINS

Delmer L. Cottle, Highland Park, and David W. Young, Westfield, N. J., assignors to Esso Research and Engineering Company, a corporation of Delaware No Drawing. Application March 29, 1954, Serial No. 419,591

9 Claims. (Cl. 260—597)

This invention relates to a new hydration catalyst and to the hydration of olefins in the presence thereof. More particularly it relates to a special non-corrosive metallic copper catalyst, preferably in finely divided form, and to the use of such catalyst in the hydration of light olefins such as propylene, especially when carried out in iron or steel reactors.

The catalytic conversion of light olefins to alcohols by direct hydration is a well-known reaction which is constantly gaining in commercial importance. Such hydration is the source of valuable alcohols, ketones and ethers which variously find use as solvents, reagents in the preparation of more complex chemicals, and so on. However, one of the drawbacks of this reaction is that conventional catalysts such as phosphoric or sulfuric acids, or sulfates of copper or silver, cause rapid corrosion of the reaction chambers and auxiliary equipment when the reaction is conducted in steel. Consequently, it has been heretofore necessary to line commercial steel reactors with copper or glass linings, and to provide copper piping and special corrosion resistant pumps and the like. This has proved to be an expensive as well as a cumbersome complication.

It is the object of the invention to provide a non-corrosive olefin hydration process. A more specific object is to provide a catalyst which will catalyze hydration of olefins such as propylene without being corrosive to steel and other metallic construction materials.

It has now been discovered that metallic copper can be made into a highly active, water insensitive, non-corrosive hydration catalyst by proper treatment. In particular it has been discovered that copper metal surfaces can be converted into an active, but non-corrosive hydration catalyst, particularly when the metal itself is in finely divided form. This is accomplished by treating the metallic copper, in whatever form, shape or size, with a hot acid such as phosphoric acid under suitable conditions and then washing the acid treated metal with cold water until the wash water becomes substantially neutral.

For purposes of the invention the metal may be present in various physical shapes. For instance, when the reaction conditions permit a reaction time of five or more hours at pressures in excess of about 1000 p. s. i. g., sufficient catalytic surface can be obtained by using a copper-lined reactor the inner walls of which had been activated in accordance with the present invention. Alternatively, in batch runs operated under relatively severe conditions sufficient catalytic activity can be obtained by employing the activated copper metal in the form of small cylinders, cubes or shots, having a diameter of about 1 to 5 millimeters, or in the form of wire, wire mesh, flakes, sheets, etc. However, in continuous runs where contact time is relatively short, copper yields only a relatively small amount of product unless it is present in very finely divided form, e. g. in the form of particles having a size below about 200 microns and preferably between about 3 to 50 microns. While substantially pure copper metal is best, copper-containing alloys such as brass or bronze may also be used with somewhat similar effect.

Furthermore, while it is greatly preferred that the activated copper itself be in very finely divided form, it is not necessary that the catalyst as such be in finely divided form. For instance, a highly active catalyst can be prepared according to the present invention by pilling the finely divided catalyst with activated carbon, wood char, petroleum coke and similar supports. Other adsorbent supports such as silica or titania gel can be used likewise, but are not nearly so effective as carbonaceous supports which appear to have a synergestic effect with the copper. The weight ratio of support to copper may range, for instance, from about 2/1 to 100/1, preferably about 5/1 to 20/1. When a supported catalyst is being prepared it is possible to activate the copper with the acid either before or after mixing with the support, or the catalyst may be activated after pilling. However, particularly in the case of carbonaceous supports it is advantageous to activate both the copper and the carbon, preferably as a powdery mixture before pilling, since the carbon itself also appears to benefit from the acid treatment. Instead of pilling the activated powdered copper catalyst, it can also be used in the conversion zone in the form of a dense turbulent bed using the upflowing gaseous reagents as a fluidizing gas.

Orthophosphoric acid in concentrations of at least 10 percent, and preferably of about 60 to 90 percent is particularly useful as the treating acid in activating the copper catalyst. However, sulfuric acid in concentrations from 10 to 98% is also useful. About 1 to 300 parts, or preferably 5 to 15 parts of the acid (calculated as 100% $H_3PO_4$ or $H_2SO_4$) is used for treating 100 parts of metal. The optimum amount depends somewhat on the degree of subdivision or surface area of the metal treated, as well as on the presence or absence of support. Of course, enough acid is used to assure proper wetting of all of the metal present. Furthermore, to assure effective contact, it may be desirable to free the metal of any oil and grease and similar contaminants by washing it with a solvent such as carbon tetrachloride or petroleum ether prior to the acid treatment. The clean metal is contacted with the acid at about 80 to 400° C., preferably at about 200 to 300° C., for a period of about 0.5 to 5 hours. As a result of this acid treatment not more than about 0.1 to 2 percent of the copper is usually dissolved. After completion of the acid treatment the acid is poured off and the copper metal is thoroughly washed with water at room temperature, that is at about 5 to 40° C. The amount of water used may range from about 0.5 to 10 liters per 100 g. of catalyst, depending largely on the size and number of portions of wash water used. When placed in cold water, the washed catalytic copper product is substantially neutral, that is, it does not increase perceptibly the hydrogen ion concentration of the water; that is, the pH value of such water at room temperature will remain above 5, and preferably between about 5.5 and 7.

The copper treated as just described is a surprisingly effective catalyst for the direct hydration of olefins. In particular it is useful in hydrating propylene, but similar advantages can be obtained in using it in hydrating other light olefins having 2 to 4 or 5 carbon atoms per molecule such as ethylene, butene-1, butene-2, isobutylene and amylenes, and particularly in hydrating $C_3$–$C_4$ hydrocarbon fractions containing principally a mixture of propylene and butenes.

In hydrating the olefin, water of hydration is fed to the reaction zone in a ratio of about 0.5 to 3 moles per mole of olefin, depending at least partially on the type of product distribution desired. For instance, it has been discovered in the hydration of propylene that by keeping the water-to-propylene mole ratio between about 0.5 and 0.75 or at the very most 1, the alcohol product will contain a surprisingly large amount of acetone, e. g. 5 to 10% on the alcohol, with scarcely a trace of ether or polymer. Conversely, when the water/olefin mole ratio is increased particularly to values in excess of 2, the alcohol product will contain about 5 to 10% of ether and 10 to 20% of polymer, but only 1 or 2 percent of acetone.

The hydration reaction may be carried out at temperatures of about 150 to 400° C., preferably at about 175–225° C., and at pressures of about 500 to 6000 p. s. i. g., preferably at about 2500 to 3500 p. s. i. g.

The operation and specific advantages of the invention will be illustrated further by the following specific examples.

EXAMPLE 1

100 grams of copper wire of 2 mm. diameter, cut in lengths ranging from about 0.5 to 5 inches, was contacted in a glass beaker with 300 g. of 85% H₃PO₄ (orthophosphoric acid). The beaker containing the wire and acid was heated at about 100° C. for about 5 hours with occasional stirring. At the end of this period the mixture was allowed to cool to room temperature and the acid poured off. The treated copper wire was then washed successively with five 300 ml. portions of cold water and allowed to dry in air. This washed copper wire weighed 98.7 grams. When this copper wire was immersed in pure distilled water, the hydrogen ion concentration of the water remained unchanged as indicated by a pH reading of 7 before and after addition of the copper.

Various amounts of the treated copper wire indicated in Table I were charged to a steel bomb having a volume of 0.8 liter. Fresh catalyst was used in each case. Also added to the bomb in each run were 210 grams of pure liquefied propylene and indicated amounts of water. In each run the bomb was heated for 8 hours in an agitated rocker at a temperature of 275° C. and a pressure of 3000 p. s. i. g. The results obtained are summarized in Table I.

Table I

| Run | $H_2O/C_3H_6$ Ratio | Catalyst Wire (grams) | Yield of Product (grams) | Acetone | Ether | Alcohol | Polymer |
|---|---|---|---|---|---|---|---|
| 1 | 2 | none | .6 | 0.7 | 0.9 | 94 | 3.3 |
| 2 | 2 | 5 | 39 | 1.0 | 7.9 | 76 | 13.9 |
| 3 | 2 | 12 | 42 | 0.7 | 7.8 | 75 | 16.0 |
| 4 | 2 | 25 | 53 | 2.1 | 8.7 | 70 | 19.0 |
| 5 | 0.6 | 25 | 83 | 7.0 | | 93 | |

After separation of the hydration product from the catalyst in run 3, the latter was washed with water. The washed catalyst was re-used in another hydration run substantially identical with run 3 described above, and an identical yield and product distribution was obtained. In fact, even after the same catalyst had been used consecutively in three separate runs, its activity and selectivity remained substantially unaffected. It is thus apparent that the catalyst has an excellent catalyst life and that it may be kept on stream for very long periods without reactivation or replacement. However, when product yields finally begin to drop due to a decrease in catalyst activity, additional active copper catalyst may be added to the reactor or the reaction may be interrupted and the catalyst retreated with acid and water in the same manner as in the original catalyst preparation. It has also been observed that catalyst life can be substantially extended by providing the iron or steel reactors with inert non-metallic surfaces such as glass or carbon liners.

Furthermore, a comparison between runs 4 and 5 is interesting. These runs differ from each other only in that the water/olefin ratio is very much less in the latter case. It will be observed that as a result of this reduced water/olefin ratio the selectivity to acetone is increased more than three fold. The same effect was observed in a pair of eight-hour bomb runs wherein propylene was hydrated at 220° C. and 3500 p. s. i. g. in the presence of different water/olefin ratios and in the presence of other hydration catalysts, notably 85% H₃PO₄ added to the reaction zone in an amount equal to 8% based on propylene. Here again, when a water/propylene mole ratio of 2 was used the total yield and acetone content of the product were similar to the results of runs 2 and 3 described above, the acetone equalling about 1% of the hydrated product on an olefin-free basis. In contrast, when the water/olefin ratio was lowered to 0.6, the acetone content rose to about 7% of the hydrated product and the total product yield was 33% based on propylene feed. It is thus apparent that by keeping the water/propylene mole ratio between about 0.5 and 0.75, a surprisingly advantageous process is obtained for the production of acetone.

EXAMPLE 2

Another hydration catalyst was prepared according to this invention by treating copper shot particles of about 3 mm. diameter with three times its weight of 85% phosphoric acid under the same conditions as described in Example 1. The treated copper shot was washed free of acid until substantially neutral.

12 grams of the treated copper shot were placed in a steel bomb of 0.8 liter capacity, together with 210 grams of liquefied propylene and 180 grams of water. The bomb was heated for eight hours at a temperature of 275° C. and a pressure of 3000 p. s. i. g. Again, a liquid hydrated product rich in isopropyl alcohol was obtained in a yield of about 40 percent, thus substantially duplicating run 3 of Example 1.

Similar results were also obtained by treating a copper liner in accordance with the present invention and placing the treated and washed copper liner in the steel bomb instead of using treated copper shot or wire.

The reactor was carefully inspected at the end of each run and in every instance it was found that the copper catalysts of the present invention caused no apparent corrosion.

EXAMPLE 3

The treated copper shot prepared as described in Example 2 was also used in a continuous run. In this case about 500 grams of the treated copper shot was charged to a cylindrical steel reactor of about 1.7 liter capacity. A preheated mixture of one part of propylene gas and two parts of water vapor was then passed downwardly through the catalytic reactor at a rate corresponding to about 2 volumes of liquefied propylene per volume of reactor per hour, at a temperature of 480° F. and a pressure of 1000 p. s. i. g. The reactor effluent was passed through a water condenser and collected in a bomb under reaction pressure.

After two hours the feed was stopped, gas was gradually vented from the product receptacle and the remaining liquid product was distilled. The fraction boiling from 55 to 92° C. was collected and dried over calcium sulfate. About 90 grams of dry liquid organic product was obtained in this manner, corresponding to a yield of about 1.5 percent based on propylene feed. The product consisted essentially of about 98% isopropyl alcohol, 1% diisopropyl ether and 1% acetone, as determined by spectrographic analysis. A small amount of oily bottoms was also recovered in the distillation and was found to consist of higher polymers of propylene.

It is apparent that in this continuous run the yield of desired hydrated products is very much less than in the batch runs described before. Somewhat better yields can be obtained with this type of catalyst even in continuous runs, if a longer contact time and higher pressure or both can be provided. However, very much better yields can be obtained by using the activated copper in more finely divided form as described in the following example.

EXAMPLE 4

In this example the catalyst was prepared from Malone "Fernlock" copper powder. This copper powder is a commercial product which is obtained from thin copper sheets by an intense shredding or shearing action and consists of very fine fern-shaped flakes or scales which have an average diameter of about 5 microns. 30 grams of this copper powder was mixed with 300 grams of powdered activated coconut carbon and 300 grams of 85% phosphoric acid was added to the mixed solids. The resulting mixture was heated for three hours at 100° C., whereupon the temperature was raised to 250° C. and the mixture was kept at this temperature for two additional hours. After this the mixture was cooled and free acid was removed by washing the solids on an acid resistant filter with cold distilled water until the wash water had a pH value of 7. Five 1000 ml. batches of water were used to wash the solids. Then the solids were dried and pelletized to form catalyst tablets about 10 mm. in diameter and 5 mm. high. 500 ml. of this pelletized catalyst weighed 449 grams.

This carbon-supported copper catalyst was placed in the same steel reactor as described in Example 3. A preheated gas mixture containing two moles of water per mole of propylene was passed through the catalyst-containing reactor at a temperature of 230° C. and a pressure of 1000 p. s. i. g. at a feed rate corresponding to two volumes of liquefied propylene per volume of reactor per hour. The duration of the run again was two hours. The reactor effluent was collected and recovered in the same manner as in Example 3. Again, no corrosion whatever was detected on careful inspection of the steel reactor at the end of the run.

In this case about 54.0 grams of dry liquid product boiling between 55 and 92° C. was recovered. This again consisted of about 98% isopropyl alcohol, the rest being diisopropyl ether and acetone. In addition to this oxygenated product, about 50 grams of higher boiling liquid propylene polymers were also recovered.

It will be noted that in this continuous run the yield of hydrated product was about six times greater than in Example 3 wherein activated copper shot was used. It is thus apparent that the finely divided copper catalyst is unobviously superior to the coarser forms of activated copper, particularly where the hydration is to be carried out on a continuous basis. Continuous feed rates suitable in conjunction with the presently described activated copper catalysts may conveniently range from about 0.5 to 3.5 or 5 volumes of liquid olefin per reactor volume per hour. Furthermore, even in connection with the finely divided copper catalyst, a further improvement in yield can be obtained by operating at higher pressures, e. g. at 2500 to 5000 p. s. i. g.

It will be understood that all ratios and percentages stated herein are expressed on a weight basis, unless otherwise indicated.

Having described the general nature of the invention and illustrated it by specific examples, the extent of desired patent protection is particularly pointed out in the appended claims.

We claim:

1. A process for preparing a hydration catalyst which comprises mixing 1 to 300 parts of 60 to 90% orthophosphoric acid with 100 parts of particulate metallic copper, heating the mixture at a temperature of about 100 to 400° C. for about 0.5 to 5 hours until about 0.1 to 2 percent of the copper is dissolved, decanting the liquid from the treated copper, and washing the resulting activated copper with water until the copper becomes substantially neutral.

2. A process according to claim 1 wherein the copper is in the form of a finely divided powder having an average particle diameter of less than about 200 microns.

3. A process for preparing a hydration catalyst which comprises mixing one part of finely divided clean metallic copper powder having an average diameter of about 3 to 50 microns, 5 to 20 parts of a powdered carbonaceous adsorbent support, and about 10 parts of 60 to 90% orthophosphoric acid, heating the mixture at a temperature of about 100 to 400° C. for at least one-half hour and until about 0.1 to 2 percent of the copper is dissolved, separating the acid from the solid powder, washing the separated powder with water until substantially neutral, and drying and pelletizing the washed powder.

4. A process according to claim 3 wherein the support is an activated carbon.

5. A particulate catalyst prepared according to process of claim 1.

6. An activated copper catalyst prepared according to the process of claim 4.

7. A process for hydrating a $C_2$ to $C_4$ olefin feed which comprises contacting water with said olefin feed in a ratio of about 0.5 to 3 moles of water per mole of olefin at a temperature of about 100 to 400° C. and a pressure of 500 to 5000 p. s. i. g. in the presence of a copper catalyst prepared by the process of claim 1.

8. A process according to claim 7 wherein the olefin feed comprises a major proportion of propylene.

9. A process for hydrating a propylene-containing olefinic feed which comprises continuously passing a mixture of about 1 mole of olefinic feed and about 0.5 to 3 moles of water at a temperature of about 100 to 400° C., and a pressure of 1000 to 5000 p. s. i. g. and at a rate of about 0.5 to 3.5 liquid volumes of said olefinic feed per volume of reactor per hour through a reaction zone containing a hydration catalyst prepared according to the process of claim 4.

References Cited in the file of this patent

UNITED STATES PATENTS

| 1,999,620 | Van Peski et al. | Apr. 30, 1935 |
| 2,585,185 | Supiro | Feb. 12, 1952 |

FOREIGN PATENTS

| 644,240 | Great Britain | Oct. 4, 1950 |

OTHER REFERENCES

Tapp, Ind. and Eng. Chem., vol. 44, September 1952, page 2021.

Mellor: "Comprehensive Treatise on Inorganic and Theoretical Chemistry," vol. III, pp. 234–5 and 287.